June 5, 1951  J. M. CHAMBERS  2,555,471
JACK FOR TRACTORS
Filed Aug. 11, 1949
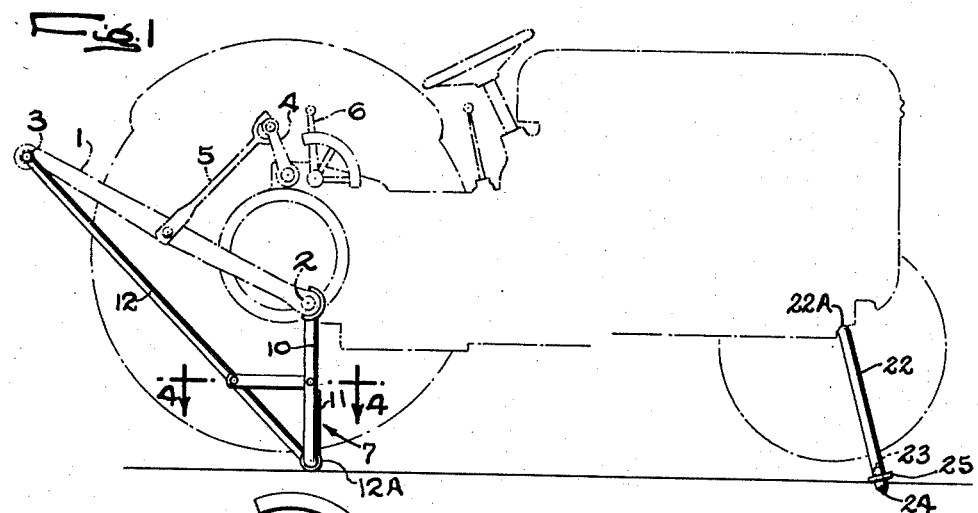
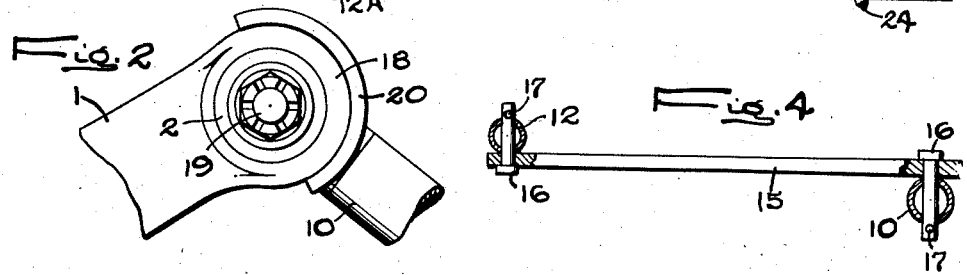
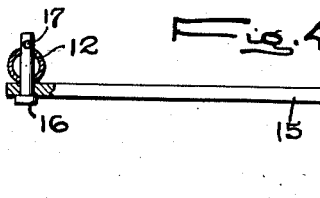
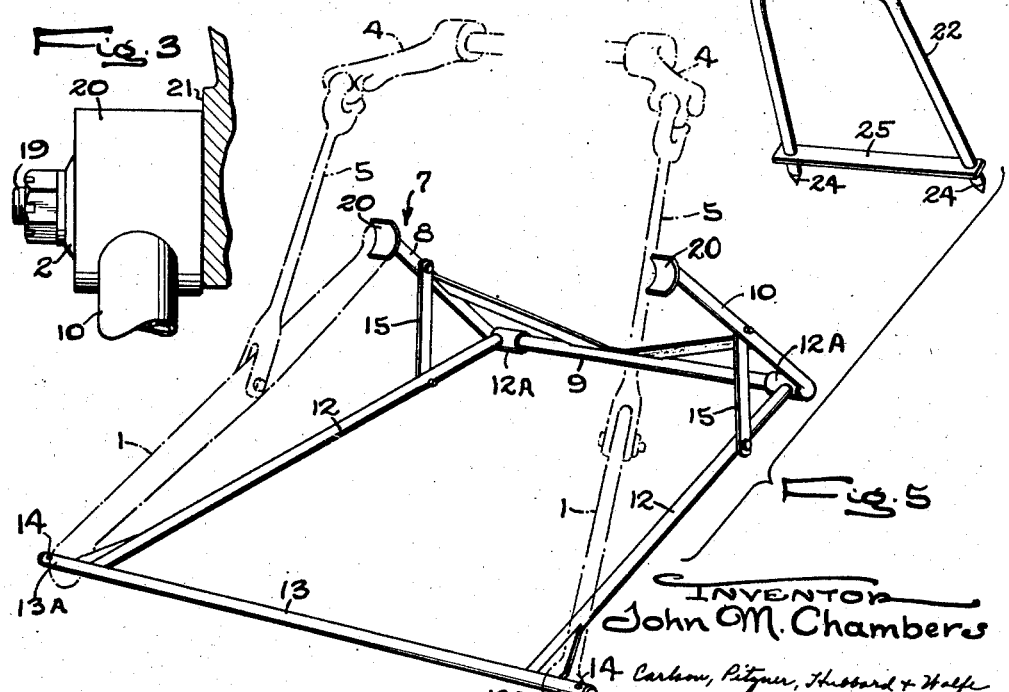
INVENTOR
John M. Chambers
Carlson, Pitzner, Hubbard & Wolfe
ATTORNEY Patented June 5, 1951

2,555,471

UNITED STATES PATENT OFFICE 2,555,471

JACK FOR TRACTORS

John M. Chambers, Blackdown Hill, Leamington Spa, England, assignor to Harry Ferguson, Ltd., Coventry, England, an English company Application August 11, 1949, Serial No. 109,650
In Great Britain August 13, 1948

2 Claims. (Cl. 254—94)

This invention relates to a jack for a tractor of the kind having a pair of laterally spaced, vertically swingable power operated links trailingly pivoted on its rear end portion, the jack being of the type which comprises a stand adapted to be engaged under the tractor and with the ground in an inclined position and adapted to be connected to the links so that vertical movement of the latter moves the stand to a less inclined or more vertical position and thus raises the tractor wheels from the ground.

In an existing jack of this type the stand consists of a U-frame which has yokes at its top end for engaging under the ends of the tractor rear axle casing and which is connected to the links by a further U-frame extending from the bottom of the stand to the rear ends of the links. Inasmuch as the engagement of the stand with the tractor axle casing is eccentric with respect to the pivotal connections of the front end of the links to the tractor it is necessary that the further frame be pivotally connected to the stand to allow the upward swing of the links.

One object of the invention is to provide a jack of the type referred to which eliminates the need for the pivotal action between the stand and the frame connecting the stand with the links during the lifting movement.

According to the invention, a jack of the type referred to for a tractor of the kind referred to, is characterized by engagement means at the top of the stand for detachable pivotal engagement with the tractor at points co-axial or concentric with the pivotal connections of the links with the tractor and characterized by connection means rigid with the stand for connecting the latter with the links so that on raising of the links the stand and connection means swing as a single rigid unit with the links around the forward pivotal connections of the latter.

The said engagement means preferably consists of cup members adapted to engage the forward ends of the links and the means for connecting the stand to the links may comprise a frame having a pivotal connection with the stand and means whereby the stand and frame can be locked together at an angle to each other as a rigid unit or released to assume a flat collapsed relationship.

In further accordance with the invention, we provide for use in association with the rear jack a front jack comprising a stand adapted for engagement at its top end under the front of the tractor and having a sharp ground-engaging lower end which bites into the ground when the rear jack is actuated to lift and incidentally move the tractor forwardly during the lifting of the rear end, said biting action causing the front stand to swing around its lower end to a more vertical position and raise the front of the tractor without the need for a chain or link connection between the lower ends of the front and rear stands as hitherto used.

In order that the invention may be clearly understood the following more specific embodiment will now be described, by way of example, as applied to the well known tractor sold under the trade-mark "Ferguson" and with reference to the accompanying drawings in which:

Fig. 1 is a side elevation of the tractor when raised by a front and rear jack in accordance with the invention.

Fig. 2 is a detailed fragmentary view showing the engagement at the forward end of the links.

Fig. 3 is a view taken at right angles to Fig. 2.

Fig. 4 shows the means for fixing the struts in position.

Fig. 5 is a perspective of the jack of Fig. 1 with the same shown in lowered position and with the power-operated linkage elements on the tractor shown in phantom.

The tractor is indicated in dot-dash lines in Fig. 1 and has a pair of links 1 universally connected thereto on the balls 2 and having universal balls 3 in the rear ends, these balls being apertured to receive pins or the like on the various agricultural implements that are commonly attached to the links. The links 1 can be raised and lowered by means of the usual hydraulic power unit in the tractor, which unit is connected to the links 1 through the cranks 4 and connecting links 5 and is controlled by the hand lever 6.

The rear jack consists of a U-stand 7 formed of tubes 8, 9, 10 which are welded together and connected by reinforcing struts 11. The stand is connectible to the tractor links by a U-frame consisting of tubular side arms 12 welded to sleeves 12A which are rotatable on the base 9 of the stand. The arms 12 are also welded to the cross tube 13 which forms the intermediate portion of the U and which projects beyond each arm to form a projecting pin 13A for insertion through the apertured balls 3 of the links 1. Cross holes 14 are provided in the pins 13A for the insertion of retaining pins (not shown). It will be understood that the stand 7 and connecting U-frame are hingedly connected by the sleeves 12A but in normal use they are formed into a rigid unit by locking means in the form of struts 15 which are detachably connected to the stand and frame by headed pins 16 having cross holes 17 for retaining pins (not shown). The provision of these detachable struts enables the stand and U-frame to be folded flat for easy transport or storage.

At the top of each side limb 8, 10 of the stand there is attached a member for detachable engagement with the front end of the respective tractor link 1. Each of the usual links 1 is of flat bar form and is rounded at the front end 18 which contains the universally movable ball 2 which is mounted on a pin 19 projecting from the tractor (Figs. 2 and 3). The said member consists of a semi-circular or moon-shaped part 20 of which the lower end is attached to the top of the limb 8 or 10 so that said part constitutes a half cup or cradle facing to the rear, the plane of the mouth being tilted slightly forwardly of the axis of the limb. It will be apparent from inspection of Figs. 1 and 5 that the cradling combined with the bracing of the frames causes the stand to be captive and to swing as a more or less rigid unit with the tractor draft link as the latter are raised and lowered.

In use the jack is pushed under the tractor until the rearwardly facing cup members 20 are in front of the links whereupon the jack is pulled back slightly so that the cups engage the rounded ends 18 of the links and then the ends 13A of the cross tube 13 at the rear are engaged with the balls 3 in the rear ends of the links (Fig. 5). Thus the jack is secured to the links and any relative fore and aft movement is precluded while relative transverse movement is precluded by the engagement of the side of the cup members 20 with the faces 21 (Fig. 3) on the tractor differential casing. On raising the links as shown in Fig. 1 the jack swings as a rigid unit with the links 1 around the forward pivots of the links. The consequent approach of the stand towards a vertical position raises the tractor and at the same time moves it forwardly, this forward movement serving to raise the front of the tractor on the front stand which consists merely of an inverted U-shaped tubular frame 22 into the lower ends of which the shanks 23 of pointed studs 24 are inserted and welded. The studs have shoulders which serve to hold in position a tie plate 25 which extends across between the limbs of the tube 22 and which serves as means to limit the depth of penetration of the studs 24 into the ground. The top cross bar 22A is engaged as shown in Fig. 1 in an angle between the crankcase and a securing flange under the front of the tractor and as the tractor moves forwardly the studs dig in and the front stand swings towards but not fully up to vertical position and so raises the front of the tractor as shown in Fig. 1.

It will be seen from the above that the use of the front ends of the links as the application point of the jack enables the provision of a rigid jack without pivotal action between the stand and the connecting frame during the lifting movement as in the existing jacks. Thus the jack can be more readily manoeuvred into or out of position and carried to the tractor. For instance, the jack can be wholly manoeuvred into position without stooping whereas with the existing jack previously referred to the operator has to stoop and lift up the jack stand to engage the rear axle casing.

Regarded from another aspect the jack in accordance with the invention comprises a framework having means for detachable attachment to the tractor rear links at points spaced along the length thereof whereby the framework becomes a rigid extension of the links and rigidly interconnects the links against lateral movement, the framework including a ground-engaging part so spaced forwardly of the links as to execute a downward and rearward movement on raising of the links. In effect the framework constitutes a projection of the links forwardly of their pivotal connections with the tractor.

I claim as my invention:

1. In a jack for a tractor having a pair of laterally-spaced vertically-swingable power-operated draft links and having pivot points for trailingly pivoting the same on the rear end portion of the tractor below the tractor rear axle, a rear end stand comprising, in combination, first and second rigid U-shaped frames, means including sleeves for pivotally connecting the outer ends of the arms of the second U to the transverse portion of the first U with the sleeves arranged for contact with the ground during normal use but enabling the frames to be collapsed into substantially the same plane for storage, means at the outer ends of the intermediate portion of said second U for attaching the same to the trailing ends of the tractor links, the upper ends of the arms of said first U having means for engaging the points of pivoting of the tractor draft links, means including a disengageable strut extending between the frames to maintain them rigidly together during normal operation so that they pivot bodily about said tractor pivot points upon raising of the draft links.

2. In a jack for a tractor having a pair of laterally-spaced vertically-swingable power-operated draft links and pivot points for trailingly pivoting the same on the rear end portion of the tractor below the tractor rear axle, a rear end stand comprising, in combination, a first rectangular frame and a second rectangular frame bracedly connected to one another along one edge of each of them to form an acute angle, said one edge being adapted for ground engagement with the first frame extending upwardly and the second frame extending upwardly and rearwardly, means including pin projections for disengageably attaching the remote edge of the second frame to the trailing ends of the tractor draft links, means for attaching the remote edge of the first frame to the pivot points on the tractor, said latter named means comprising concave members facing rearwardly and adapted to cradle the forward ends of the tractor draft links so that the stand is captive and forms a rigid swingable unit with the tractor draft links during raising and lowering thereof.

JOHN M. CHAMBERS.

REFERENCES CITED

The following references are of record in the file of this patent:

UNITED STATES PATENTS

| Number | Name | Date |
|---|---|---|
| 2,250,964 | Poor et al. | July 29, 1941 |
| 2,348,743 | McCue | May 16, 1949 |
| 2,463,305 | Poor et al. | Mar. 1, 1949 |